(12) United States Patent
Kalakanti et al.

(10) Patent No.: US 10,592,507 B2
(45) Date of Patent: Mar. 17, 2020

(54) QUERY PROCESSING ENGINE RECOMMENDATION METHOD AND SYSTEM

(71) Applicant: SIEMENS TECHNOLOGY AND SERVICES PVT. LTD., Mumbai (IN)

(72) Inventors: Arun Kumar Kalakanti, Bangalore (IN); Vinay Sudhakaran, Bangalore (IN)

(73) Assignee: Siemens Aktiengesellschaft, München (DE)

( * ) Notice: Subject to any disclaimer, the term of this patent is extended or adjusted under 35 U.S.C. 154(b) by 343 days.

(21) Appl. No.: 15/540,088

(22) PCT Filed: Jan. 12, 2015

(86) PCT No.: PCT/IN2015/000014
§ 371 (c)(1),
(2) Date: Jun. 27, 2017

(87) PCT Pub. No.: WO2016/113747
PCT Pub. Date: Jul. 21, 2016

(65) Prior Publication Data
US 2018/0268035 A1 Sep. 20, 2018

(51) Int. Cl.
*G06F 16/00* (2019.01)
*G06F 16/2453* (2019.01)
(Continued)

(52) U.S. Cl.
CPC ...... *G06F 16/2453* (2019.01); *G06F 16/2471* (2019.01); *G06F 16/256* (2019.01);
(Continued)

(58) Field of Classification Search
CPC ............ G06F 16/2453; G06F 16/2454; G06F 16/24542; G06F 16/24549; G06F 16/8365
See application file for complete search history.

(56) References Cited

U.S. PATENT DOCUMENTS

| 8,392,392 B1 * | 3/2013 | Ruf ...................... G06F 16/951 707/706 |
| 2006/0259460 A1 * | 11/2006 | Zurek ................... G06F 16/903 |

(Continued)

OTHER PUBLICATIONS

Chen, Yanpei, et al. "The case for evaluating mapreduce performance using workload suites." Modeling, Analysis & Simulation of Computer and Telecommunication Systems (MASCOTS), 2011 IEEE 19th International Symposium on. IEEE, 2011.

(Continued)

*Primary Examiner* — Thu Nguyet T Le
(74) *Attorney, Agent, or Firm* — Lempia Summerfield Katz LLC (57) ABSTRACT

Methods and systems are disclosed for providing recommendation of a query processing engine from multiple query processing engines. The method includes receiving queries by a query receiving unit, extraction of features of the query by a feature extractor, checking for a similar query in a knowledge base by an evaluator, executing the query on multiple query processing engines by a scheduler, and collecting execution statistics for each query processing engine if the similar query is not found in the knowledge base or fetching the suitable query processing engine from the knowledge base if the similar query is found in the knowledge base and executing the query on that query processing engine. The method also includes providing the recommendation of a single query processing engine from multiple query processing engines by the evaluator based on a recommendation value calculated for every query processing engine.

16 Claims, 3 Drawing Sheets

(51) Int. Cl.
*G06F 16/2458* (2019.01)
*G06F 16/335* (2019.01)
*G06F 16/33* (2019.01)
*G06F 16/903* (2019.01)
*G06F 16/25* (2019.01)

(52) U.S. Cl.
CPC ........ *G06F 16/335* (2019.01); *G06F 16/3346* (2019.01); *G06F 16/3347* (2019.01); *G06F 16/90335* (2019.01)

(56) References Cited

U.S. PATENT DOCUMENTS

2010/0057675 A1* 3/2010 White .................... G06Q 30/02 707/E17.108
2010/0281012 A1* 11/2010 Imig ..................... G06F 16/951 707/708
2014/0358879 A1 12/2014 Bao et al.

OTHER PUBLICATIONS

Ganapathi, Archana, et al. "Statistics-driven workload modeling for the cloud." Data Engineering Workshops (ICDEW), 2010 IEEE 26th International Conference on. IEEE, 2010.

Shi, Yingjie, et al. "Benchmarking cloud-based data management systems." Proceedings of the second international workshop on Cloud data management. ACM, 2010.

International Search Report and Written Opinion for PCT/IN2015/000014, dated Jul. 21, 2016.

* cited by examiner

QUERY PROCESSING ENGINE RECOMMENDATION METHOD AND SYSTEM

The present patent document is a § 371 nationalization of PCT Application Serial Number PCT/IN2015/000014, filed Jan. 12, 2015, designating the United States, which is hereby incorporated by reference.

TECHNICAL FIELD

The present disclosure relates to the field of massively parallel query processing engines, and more particularly to providing a recommendation for execution of a query on a suitable processing engine from multiple available query processing engines.

BACKGROUND

Handling huge volumes of data on a daily basis is a task that most organizations have to deal with. Such organizations have been storing huge volumes of data for decades, but now with the availability of new techniques for analyzing those huge data sets, organizations seek to improve their operational efficiency. Data sets today aren't merely larger than the older data sets, but also significantly more complex, for example, unstructured and semi-structured data generated by sensors, web logs, social media, mobile communication, and customer service records.

There are many software frameworks to store and analyze large volumes of data in a massively parallel scale. Apache Hadoop is an example and often cited in many journals, publications, blogs, and other technical articles for massively parallel processing system. It is now known to be the de-facto technology platform for supporting storage of massive amounts of heterogeneous data and processing them.

The Hadoop Distributed File System (HDFS) for data storage and its specialized distributed programming model 'MapReduce' for data processing, across relatively inexpensive commodity hardware, may be leveraged for mixing and matching data from many disparate sources and reveal meaningful insights.

However, Hadoop as a technology has several limitations. First, organizations are interested in 'interactive analytics', a solution requiring faster time-to-insight when compared to the time it takes for a MapReduce job to execute and provide the required results. Second, the ability to enable analysts and data scientists to directly interact with any data stored in Hadoop, using their existing business intelligence (BI) tools and skills through a well-accepted SQL interface. Apache Hive, however, facilitates querying the data using an SQL-like language called HiveQL, but it is much slower than what the industry demands in terms of interactive querying.

There are several massively parallel query processing (MPQP) tools available in the market that enable organizations to perform interactive SQL-like querying on massive data-sets on the Hadoop platform, called SQL-on-Hadoop tools. However, each of these tools is optimized to perform efficiently for a certain class of queries only, operating on a certain known data type and format on a well-defined hardware and software configuration. The data model and the storage model have to be optimized significantly in order to obtain faster query response times.

To add to the problem, the technological landscape of massively parallel query processing frameworks is large and it becomes increasingly difficult for organizations to evaluate each of these tools for the different kinds of queries they have for processing, operating on varying data-sets, (for example, queries from marketing, analysts, engineers, and senior management).

SUMMARY AND DESCRIPTION

It is an object of the present disclosure to provide a platform that would enable automatic selection and execution of queries on a framework that is best suited for its execution. It is another object of the present disclosure to provide a recommendation system for efficient, time-bound execution of queries on multiple massively parallel query processing engines.

The object is achieved by the method and system disclosed herein which provides a recommendation of a query processing engine from multiple query processing engines based on the features of the query, amongst other criteria, as explained later. The features of the query are extracted and compared with an evolving knowledge base, which stores information about the various MPQP frameworks. The platform then executes the query on the recommended framework, technology or the recommended query processing engine. Machine learning techniques are used to automatically update the knowledge base.

The platform also provides a layer of abstraction to the users to submit queries, while leaving the choice of technology, (e.g., the query processing engine), and execution to the framework.

A method for providing recommendation of a query processing engine from multiple query processing engines is disclosed. The method includes receiving queries by a query receiving unit. The queries have features with respect to a term index ($q_i$), where the term index ($q_i$) refers to the position of a feature in a particular query with respect to other features in the same query. Each query is also associated with its corresponding service level agreement requirements. The query receiving unit is an interface through which the queries may be submitted. The same interface is also used for submission of the service level agreement requirements from the user.

The next act involves extraction of features of the query by a feature extractor. Thereafter, the feature extractor calculates a feature weight ($w_{fi}$), for each feature of the query with respect to the term index ($q_i$), and a query weight ($W_Q$) from the feature weights ($w_{fi}$) of the query.

The third act includes checking for a similar query in a knowledge base by an evaluator. The evaluator looks for a similar query by finding a common term vector ($C_{ij}$) between the query received by the query receiving unit and other queries already stored in the knowledge base. The common term vector ($C_{ij}$) is evaluated by using the feature weights ($w_{fi}$) and the query weight ($W_Q$) obtained in the previous act. If a similar query is not found in the knowledge base, the next act would involve execution of the query on multiple query processing engines by a scheduler and collection of execution statistics for each query processing engine. However, if a similar query is found in the knowledge base then an act of fetching of execution statistics for each query processing engine from the knowledge base is performed.

The final act involves providing recommendation of one query processing engine from the multiple query processing engines by the evaluator based on a recommendation value (RV) calculated for each query processing engine.

The service level agreement requirements are the requirements that are to be adhered to, so that the final result obtained after execution of the queries meets the expected result standards. Response time to be taken for execution of the query, resource utilization for query execution, system latency, etc. may be some examples of the service level agreement requirements.

The act of checking if a similar query exists in the knowledge base by the evaluator involves finding out common terms between the query received and the queries stored in the knowledge base. For this, the common term vector ($C_{ij}$) is calculated between the two queries, wherein the first query is the query received by the query receiving unit and the second query is the query being tested for similarity fetched from the knowledge base.

A query set is defined by $Q=\{Q_1, Q_2, \ldots, Q_n\}$, where $Q_1$, $Q_2, \ldots Q_n$ are a set of queries. A given query $Q_f$ is converted into a term index vector '$q_i$' and a weight vector '$w_i$' and is represented by the set as:

$Q_f=\{(q_1, w_{1Qf}), (q_2, w_{2Qf}), \ldots, (q_n, w_{nQf})\}$, where $q_i$ is a term index of $Q_f$ and $w_{iQf}$ represents the weight of the $i^{th}$ term in query $Q_f$.

The number of occurrences of a term 'i' in query $Q_f$ is represented by '$tf_{iQf}$' and is termed as term frequency. $qf_i$ is the number of queries in a collection of n queries that contain the term 'i'.

The inverse query frequency is given by:

$$iqf_i=\log(n/qf_i).$$

The weight of the $i^{th}$ term in query $Q_j$ is given by:

$w_{iQj}=tf_{iQj}*iqf_i$; where '$tf_{iQj}$' is the number of occurrences of the term 'i' in query $Q_j$ and '$iqf_i$' is the inverse query frequency calculated earlier.

The common term vector of the two queries $Q_i$ and $Q_j$ is given by:

$$C_{ij}=\{q:q\epsilon Q_i \cap Q_j\}$$

Therefore, two queries $Q_i$ and $Q_j$ are said to be similar if $|C_{ij}|>0$, where $C_{ij}$ is the number of common terms in both the queries. Similarity of the queries may also be measured by a cosine similarity.

In an embodiment of the method, the method further includes launching the query by the scheduler on the query processing engine recommended and collecting final metrics for the evaluator to display as an output to a user. This provides that the query processing engine best suited for the execution of the query is selected and the query is executed on that selected query processing engine. The result of the execution of the query along with the final metrics is available to the user for perusal as an output. Alternatively, the user may choose to select which ever query processing engine that seems appropriate based on the final metrics displayed as an output to the user.

In an embodiment of the method, the final metrics include a report of the recommendation value (RV) calculated for each query processing engine on which the query was executed and the execution statistics for the query processing engine recommended. This would give a clear picture about the performance of each query processing engine to the user and how the recommended query processing engine fares in view of the other available query processing engines.

In another embodiment, the method further includes updating the knowledge base with the execution statistics, the final metrics, and the recommendation of the query processing engine. This would help in keeping the knowledge base updated with the latest data. Also, storing the information in the knowledge base would help in the act of checking for a similar query in the knowledge base by the evaluator. The knowledge base acts like a storehouse of information related to queries, their execution statistics, information about the recommendations of query processing engines that were made previously, etc. Such information would be useful when the query processing engines are being evaluated or even for any other analysis purposes.

The knowledge base may be a multi-dimensional database, a Graph database, or a NoSQL database storing information about various query processing engines or technologies. For each of the query processing engines or technologies, multiple levels of features and their supported parameters are stored. For example, Impala, a massively parallel query processing framework has a set of supported storage format parameters like, Parquet, Sequence File, Text File, etc., which are considered for the feature or evaluation criteria, e.g., 'Aggregation'.

Additionally, the knowledge base stores information pertaining to resource utilization of the query, (e.g., CPU usage, memory usage, etc.), prior recommended technology or query processing engine history, query execution times, and other such important metrics.

In an embodiment, the act of receiving queries further includes assigning an available worker from a worker pool by the workflow manager to the query and passing of the query and the corresponding service level agreement requirements by the worker to the feature extractor. The workflow manager provides that every query is being picked up by an available worker in the worker pool. The worker is an execution unit, (e.g., a Java thread). It is responsible for the entire lifecycle of the query, from query parsing, query execution to returning results of execution of the query. The workflow manager is responsible for managing the entire lifecycle of all the submitted queries.

In yet another embodiment, the recommendation value (RV) is calculated by the evaluator from a dissimilarity function (DSF(T)) derived from the query weight ($W_Q$) and a technology weight ($W_T$) corresponding to the query processing engine, a query response time deviation factor ($QRT_{deviation}$), a resource utilization pattern ($R_{Q-Unused(Ti)}$), and variables ($\alpha$, $\beta$, $(1-\alpha-\beta)$) dependent on the service level agreement requirements.

The recommendation value for a single query for a given technology $T_i$ or a given query processing engine is given by:

$$RV(T_i)=\alpha*DSF(T_i)+\beta*(QRT_{deviation})+(1-\alpha-\beta)|R_{Q-Unused(Ti)}|$$

The recommended query processing engine or the recommended technology is given by:

$RT=\min\{RV(T_i)\}$; where $T_i$ belongs to the list of technologies or the multiple query processing engines.

If the query receiving unit receives a set of representative queries then a second level recommendation value is calculated as:

$$RV(T_i)=\alpha*\Sigma_{j=Query\ 1}^{Query\ m} DSF(T_i)+\beta*(QRT_{deviation})+(1-\alpha-\beta)\Sigma_{j=Query\ 1}^{Query\ m}|R_{Q-Unused(Ti)}|$$

The recommendation value (RV) of a query processing engine is a reflection of the performance of that particular query processing engine in terms of its query processing ability and how suitable that particular query processing engine is for execution of the said query. This value helps a user to decide on the most suitable query processing engine given the query and the corresponding service level agreement requirements.

In yet another embodiment, the act of extraction of features of the query by the feature extractor further includes constructing or updating an inverted data structure maintained by the feature extractor, wherein the inverted data structure contains feature frequencies (fr). The inverted data structure helps in efficient lookup, weighing of multiple queries and in scaling up when new features are added to a query. The information stored in this inverted data structure is a subset of the information stored in the knowledge base.

In another embodiment of the method, the feature weight ($w_{fi}$) is calculated by:

$$w_{fi}(f_i, Q) = 0.1 + \left\{ 0.9 * \frac{fr(fi, Q)}{\max fr(w, Q): w \in F} \right\};$$

wherein F: Feature set $\{f_1, f_2, \ldots, f_n\}$; and where, $w_{fi}(f_i, Q)$ is the feature weight of a feature $f_i$, fr is a feature frequency, Q is the query.

The query weight ($W_Q$) is calculated by:
$W_Q = \Sigma_{i=1}^{n} (w_{fi} * e_i)$; where $e_i$ is a basis vector.

Feature frequency (fr) gives the number of times a feature occurs in a query. The feature weight ($w_{fi}$) reflects the importance of a particular feature in a given query. The value of the feature weight $w_{fi}(f_i, Q)$ is normalized to lie between 0.1 and 1. The basis vector ($e_i$) is introduced to bring in uniformity while comparing query weights ($W_Q$) of queries having different number of features.

According to an embodiment, the dissimilarity function for a particular technology 'T' or query processing engine is calculated by:

DSF(T)=arccos $\{(W_T * W_Q / \|W_T\| * \|W_Q\|)\}$; where, $W_Q$ is the query weight and $W_T$ is the technology weight.

In yet another embodiment, the query response time deviation factor ($QRT_{deviation}$) is calculated by:
$QRT_{deviation} = 1/n \ (\Sigma_{i=1}^{n} |QRT_{(Ti)} - QRT_{SLA(i)}|)$; where, $QRT_{(Ti)}$ is a query response time for the query processing engine or technology and $QRT_{SLA(i)}$ is a query response time according to the service level agreement requirements.

According to yet another embodiment, the unutilized resource vector ($R_{Q\_Unused(Ti)}$) is calculated by:
$R_{Q\_Unused(Ti)} = R_{Available} - R_{Q\_Usage(Ti)}$; where $R_{Available}$ is an available resource metric and $R_{Q\_Usage(Ti)}$ is a resource usage vector.

The resources form a cluster. Each cluster includes of CPU, memory, disk space, network etc. The query uses up the resources during execution. The utilization of CPU is represented $R_{cpu}$. Similarly, the utilization for memory, disk space, and network is represented by $R_{memory}$, $R_{disk}$, $R_{network}$ respectively. A lower value of $R_{Q\_Unused(Ti)}$ reflects a good utilization of resources from the cluster and a negative value indicates overloading of the cluster or over loading of the resources available for query execution. The vector norm of the $R_{Q\_Unused(Ti)}$ is used in the final decision-making involving recommendation of the query processing engine.

The resource usage pattern for a particular query is given by:

$R_Q = \{R_{cpu}, R_{memory}, R_{disk}, R_{network}\}$; where $0 \le R_i \le 100$ The static resources of a cluster are given by:

$R_{Cluster} = R_{cpu} * e_1 + R_{memory} * e_2 + R_{disk} * e_3 + R_{network} * e_4$ Through normalization the value of each metric is brought to a maximum of 100.

The current resource usage on the cluster is given by:

$R_{Cluster\_CurrentUsage} = R'_{cpu} * e_1 + R'_{memory} * e_2 + R'_{disk} * e_3 + R'_{network} * e_4$ Now the resources that are available for usage during query execution, e.g., the available resource metric '$R_{available}$', is calculated by subtracting the current resource usage on the cluster '$R_{Cluster\_CurrentUsage}$' from the static resources of the cluster '$R_{Cluster}$'. The equation may be shown as:

$R_{available} = R_{Cluster} - R_{Cluster\_CurrentUsage}$

Resource usage vector of a query 'Q' for a technology Ti, after a query is run, monitored and its execution statistics collected, is represented by:

$R_{Q\_Usage(Ti)} = R_{cpu\_Ti} * e_1 + R_{memory\_Ti} * e_2 + R_{disk\_Ti} * e_3 + R_{network\_Ti} * e_4$ Finally, the unutilized resource vector, $R_{Q\_Unused(Ti)}$, is calculated by subtracting the resource usage vector '$R_{Q\_Usage(Ti)}$' from the available resource metric '$R_{available}$'.

In yet another embodiment of the method, the execution statistics include the query response time ($QRT_{Ti}$) and the utilized resource metric ($R_{Q\_usage(Ti)}$) corresponding to each query processing engine or technology ($T_i$).

In an embodiment, the knowledge base stores information pertaining to at least one of feature weight ($w_{fi}$), query weight ($W_Q$), previous queries, technology weight ($W_T$), execution statistics, recommendation of the query processing engine, final metrics, and supporting parameters corresponding to each query processing engine. The knowledge base acts as a store house of information relevant for evaluation of the query processing engines during determination of the most recommendable query processing engine given a query or a set of queries.

Each query processing engine supports a set of supporting parameters. The parameter list 'p' may be defined as:

$p = (p_1, p_2, \ldots p_k)$

Each parameter is ranked, (e.g., Parquet is ranked as 1, ORC is ranked as 2, RC File as 3, and so on). $p_{L\_size}$ reflects the size of parameter list.

The position of parameters is represented as position_p1=1, 2, 3 . . . ; wherein from the knowledge base the highest impact parameter has position of 1. The parameter ranking is given by:

$p_r = p_{L\_size}$-position_p1.

Some elements may be ranked equally, e.g., in the case of joins. Weight of a parameter $p_j$ is given by:

$W_p(p_j) = p_r(p_j) / \{\max p_r(p_i) : p_i \in p\}$

The value of $W_p(p_j)$ is normalized between 0 and 1. This may be extended in the above fashion to get a normalized value between 0 and 1 if more than one parameter supports or benefits a particular feature.

The weight of a technology with respect to a feature, represented as '$W_{T(fi)}$', depends on the highest impact parameter supported by the technology or the query processing engine. Set of parameters supported by the technology T is given by:

$P_{L\_T} = \{p_{1\_p}, p_{2\_p}, \ldots \}$

Weight of a feature in a technology is given by:

$W_{T(fi)} = \max W_p(p_j)$ where $p_j \in P_{L\_T}$

Weight of a technology is given by:

$W_T = \Sigma_{i=1}^{n} (W_{T(fi)} * e_i)$

As mentioned earlier, the knowledge base is updated by the evaluator regularly, for example, each time a recommendation is made or a new query with new features is received the knowledge base is updated. This makes it an evolving data base that evolves with each recommendation.

According to an embodiment, the knowledge base is updated by a learning process equation given by:

$$P(T_i=\text{recommended}|F)=P(F|T_i=\text{recommended})*P(T_i=\text{recommended})/P(F)$$

Assuming the features are independent, $P(F|T_i=\text{recommended})$=product of $P(f_i|T_i=\text{recommended})$; where $f_i \epsilon F$. In this equation, 'P' refers to the posterior probability and $T_i$=recommended refers to the query processing engine recommended. According to this embodiment, the intelligence of the method is primarily dependent on the above learning equation. However, there may be many other techniques for realizing a similar result.

The decision of choosing a query processing engine or technology depends on how often a technology was chosen when it had a particular feature. The disclosed method provides that the earlier decisions and the subsequent outcomes in the form of posterior probability (P) is tracked and used to make future decisions. So, for a given query with a certain feature, if the posterior probability (P) for a certain query processing engine given by the above-mentioned equation is more than or equal to a user configured 'minimum acceptance probability ($K_{min}$)', then that technology or the query processing engine may be recommended for not just that particular query but also for queries that are received in future with similar features.

The knowledge base may also be updated manually by a specialist based upon the recent benchmarks available or from a benchmarking experience. The knowledge base is extendable as new technologies may be added to it based on benchmarks already conducted or from fresh benchmarks.

The above-mentioned methods are only some examples for updating the knowledge base, however, the method to implement this intelligence does not completely rely on the above-mentioned equations alone. It is only an example of one such technique that may be used, (e.g., a statistical method). The option to use advanced machine learning techniques that include clustering and classification based approaches, Neural Networks based approaches, etc. is also open for achieving a similar result.

In an embodiment of the system for providing recommendation of a query processing engine from multiple query processing engines, the system includes a query receiving unit, a workflow manager, a knowledge base, and a decision support system. The query receiving unit is for receiving queries having features and their corresponding service level agreement requirements. The workflow manager assigns an available worker from a worker pool for processing the queries. The knowledge base is for storing query features, execution statistics, technology weight ($W_T$) for each query processing engine, previous recommendations of query processing engines and final metrics. The decision support system includes of a feature extractor for extracting the features of the query, an evaluator for evaluating the multiple query processing engines and providing a recommendation of the query processing engine based on a recommendation value (RV) calculated and a scheduler for launching the query on the query processing engine recommended and collecting execution statistics.

The feature extractor, the evaluator, and the scheduler form the major components of the decision support system. The feature extractor is primarily responsible for parsing the query, (e.g., extracting the features of the query), updating an inverted data structure, and calculating the weight of the features ($w_{fi}$) and the query weight ($W_Q$). The evaluator is responsible for finding similarity of queries and interacting with the knowledge base and the scheduler to choose an appropriate technology or query processing engine. The scheduler is responsible for launching the queries on a specific query processing engine or all technologies, and collecting execution statistics to pass it over to the evaluator.

The scheduler launches the query on the recommended query processing engine or technology using a Big Data Infrastructure. The Big Data Infrastructure exists as a part of a Hadoop framework. It may be a Cloud Infrastructure as a Service (IaaS) or a private cluster containing components such as a Query Executor and Management API, a Metadata Management, a Resource Management, massively parallel query processing (MPQP) engines or technologies and a Linear Scale Query Processing Cluster and Storage.

The Query Executor & Management API executes and manages query execution on the resources or cluster. The Metadata Management manages the 'Meta' information of tables and data. The Resource Management manages cluster resources. The query processing engines, technologies or MPMQ engines include, but is not limited to, Hive, Impala, HAWQ, SparkSQL, etc. The Linear Scale Query Processing Cluster and Storage store the data and process the query. The Big Data Infrastructure is a well-known technology and hence not explained in more details here for sake of brevity.

In another embodiment of the system, the system further includes a display unit for displaying a final metrics, wherein the final metrics includes a report of the recommendation value (RV) calculated for every query processing engine on which the query was executed and the execution statistics for the query processing engine recommended.

BRIEF DESCRIPTION OF THE DRAWINGS

The present disclosure is further described hereinafter with reference to illustrated embodiments shown in the accompanying drawings, in which.

DETAILED DESCRIPTION

The above-mentioned and other features of the present technique are described herein. Various embodiments are described with reference to the drawings, wherein like reference numerals are used to refer to like elements throughout. In the following description, for purpose of explanation, numerous specific details are set forth in order to provide a thorough understanding of one or more embodiments. It may be noted that the illustrated embodiments are intended to explain, and not to limit the disclosure. It may be evident that such embodiments may be practiced without these specific details.

The idea of the present technique is to provide recommendation 21 of a query processing engine 20 that is most suitable for executing the given query 2 out of multiple other query processing engines 10. Each query 2 comes with a set of features 3 (not shown in FIG. 1) and corresponding service level agreement requirements 4. Using these features 3, the service level agreement requirements 4 as well as the execution statistics 16 as the starting points a recommendation value 19 (not shown in FIG. 1) is calculated for each of the query processing engines 1. This recommendation value 19 acts as an indicator telling how suitable a query processing engine 1 will be for execution of the received query 2. The query processing engine 1 or the technology for which the calculated recommendation value 19 is the minimum may be the technology that is recommended for the given query 2. Hereinafter, the present technique is explained in further detail.

Figure 1:
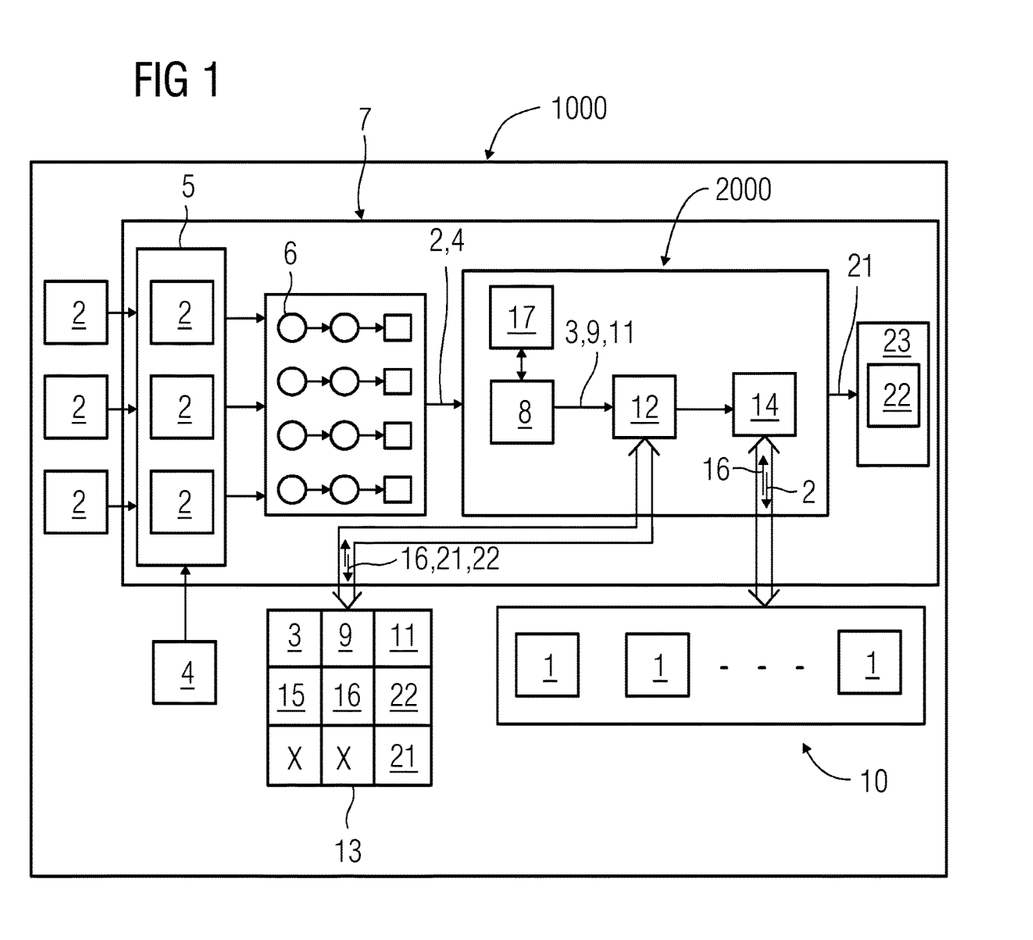
FIG. 1 schematically represents an exemplary embodiment of a system for providing recommendation of a query processing engine from multiple query processing engines.

FIG. 1 schematically represents an exemplary embodiment of the system 1000 for providing recommendation 21 of a query processing engine 20 from multiple query processing engines 10. As seen in FIG. 1, the queries 2 are received at the query receiving unit 5. The query receiving unit 5 also receives the service level agreement requirements 4 as an input. The queries 2 are then passed through a workflow manager 7. The workflow manager 7 assigns a free or an available worker 6 to the received query 2. The workflow manager 7 has a worker pool containing workers 6 responsible for the entire lifecycle of a particular query 2. The query 2 along with its service level agreement requirements 4 are then taken by the worker 6 to the feature extractor 8. The feature extractor 8 forms a first part of the decision support system 2000. The feature extractor 8 is responsible for parsing the received query 2 and extracting its features 3. The feature extractor 8 is also responsible for creating and updating an inverted data structure 17 with keyword frequency of the queries 2. The feature extractor 8 then calculates the feature weight 9 ($w_{fi}$) and the query weight 11 ($W_Q$) for the received query 2 and passes the values to the evaluator 12.

The evaluator 12 forms a second part of the decision support system 2000. The first function that the evaluator 12 performs after receiving the query 2 is to check if a similar query exists in the knowledge base 13. To check for a similar query the evaluator 12 uses the common term vector ($C_{ij}$) as mentioned earlier. Based on the value of the common term vector ($C_{ij}$) calculated between the query 2 received and other queries already available in the knowledge base 13, the evaluator 12 arrives at the answer whether a similar query as the query 2 received is available in the knowledge base 13 or not.

If the value of the common term vector ($|C_{ij}|>0$) is non-zero, then the two queries are said to be similar, or in other words, a similar query match has been found in the knowledge base 13. If there are no common terms found, then the query 2 is launched on all the query processing engines 10 by the scheduler 14 and the results of execution, (e.g., the execution statistics 16), are collected for each of the query processing engines 1.

Using the execution statistics 16 along with a dissimilarity function (DSF(T)) for a query processing engine 1 or technology and variables dependent on the service level agreement requirements 4, the recommendation value 19 (RV) is calculated by the evaluator 12. Based on this recommendation value 19 (RV), the system 1000 provides a recommendation 21 of the query processing engine 20 that is most suitable to execute the received query 2 amongst the other multiple query processing engines 10.

The recommendation value 19 (RV) is calculated by the evaluator 12 from a dissimilarity function (DSF(T)) derived from the query weight 11 ($W_Q$) and a technology weight 15 ($W_T$) (not shown in FIG. 1) corresponding to the query processing engine 1, a query response time deviation factor ($QRT_{deviation}$), an unutilized resource vector ($R_{Q\_Unused(Ti)}$) and variables ($\alpha$, $\beta$, $(1-\alpha-\beta)$) dependent on the service level agreement requirements 4.

Another important function performed by the evaluator 12 is to update the knowledge base 13. The knowledge base 13 is updated by a learning process equation of posterior probability (P). The knowledge base 13 stores information related to queries 2, query features 3 (f), feature weight 9 ($w_{fi}$), query weight 11 ($W_Q$), execution statistics 16, final metrics 22, and the decisions related to the query processing engines recommended, (in other words, the recommendations 21).

The third part of the decision support system 2000 is the scheduler 14. The scheduler 14 is responsible for executing the query 2 on the query processing engines 1. When the evaluator 12 provides the recommendation value 19 (RV), the scheduler 14 then executes the query 2 on the most suitable query processing engine 20 based on the recommendation value 19 (RV) calculated. The result of execution of the query 2 on the finally recommended query processing engine 20 is displayed together with the recommendation value 19 (RV) calculated for the other query processing engines 10 or technologies as an output to a user on the display unit 23 as the final metrics 22.

Figure 2:
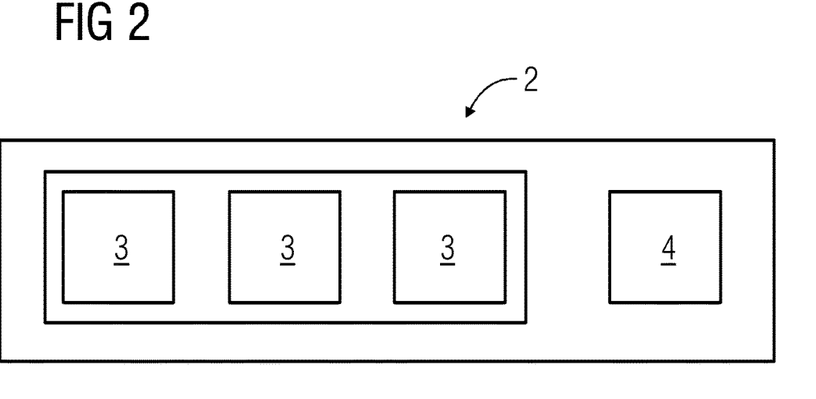
FIG. 2 schematically represents an exemplary query structure.

FIG. 2 schematically represents an exemplary query structure. Every query 2, which is received as an input by the query processing engine 1, includes query features 3 and corresponding service level agreement requirements 4. Each query 2 includes of one or more query features 3. Some examples of service level agreement requirements 4 are response time taken for execution of a query, resource utilization during query execution, system latency, etc.

Figure 3:
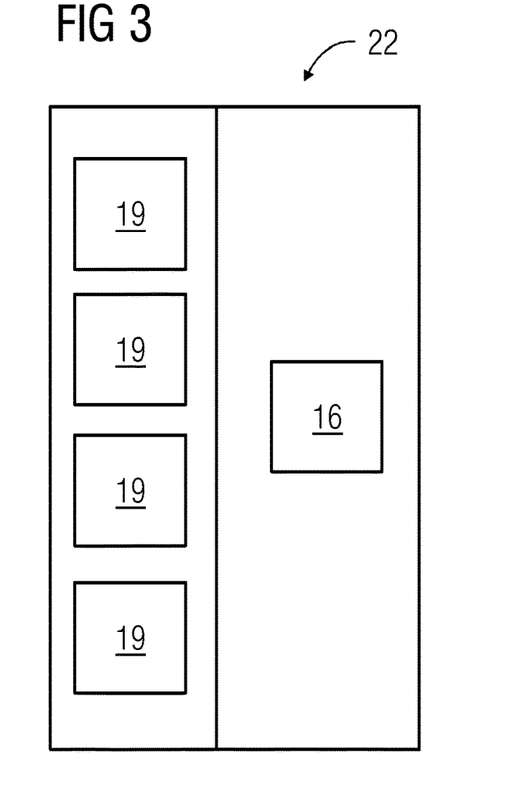
FIG. 3 schematically represents an exemplary layout of the final metrics.

FIG. 3 schematically represents an exemplary layout of the final metrics 22. The final metrics 22 is a final report that is available to the user as an output. According to FIG. 3, the final metrics 22 contains the recommendation values 19 (RV), in an ascending order, of each of the query processing engines 1 on which the query 2 was launched by the scheduler 14. The most suitable technology or the query processing engine 20 that has received the highest recommendation is listed on the top of the list of the recommendation values 19 (RV) for the technologies. Apart from the recommendation values 19 (RV), the final metrics 22, according to FIG. 3, also contains the execution statistics 16 corresponding to the recommended query processing engine 20 when the query 2 is launched on that query processing engine 20. Additionally, the final metrics 22 contains the recommendation 21 of the query processing engine 20.

Figure 4:
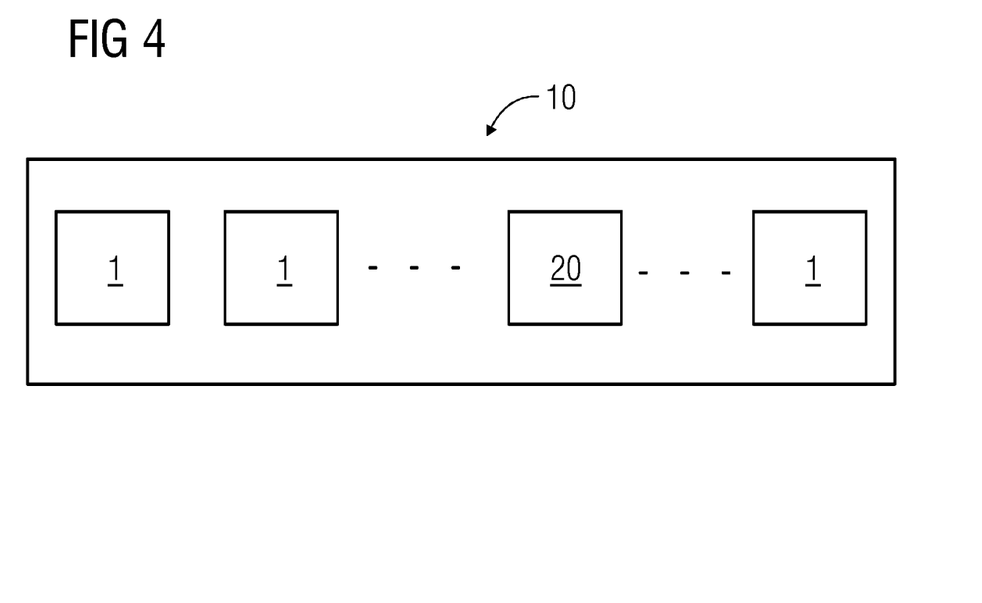
FIG. 4 schematically represents multiple query processing engines and the recommended query processing engines amongst other query processing engines.

FIG. 4 schematically represents multiple query processing engines 10 and the recommended query processing engine 20 amongst the other query processing engines 10. The system 1000 includes multiple query processing engines 10. Each query processing engine 1 is suitable for a particular type of query 2 having a certain feature 3 or features. The object of the system 1000 is to select the most suitable query processing engine 20 depending on what query 2 is received by the query receiving unit 5. The system 1000 selects one query processing engine 20 from the whole lot of query processing engines 10 as shown in FIG. 4.

Figure 5:
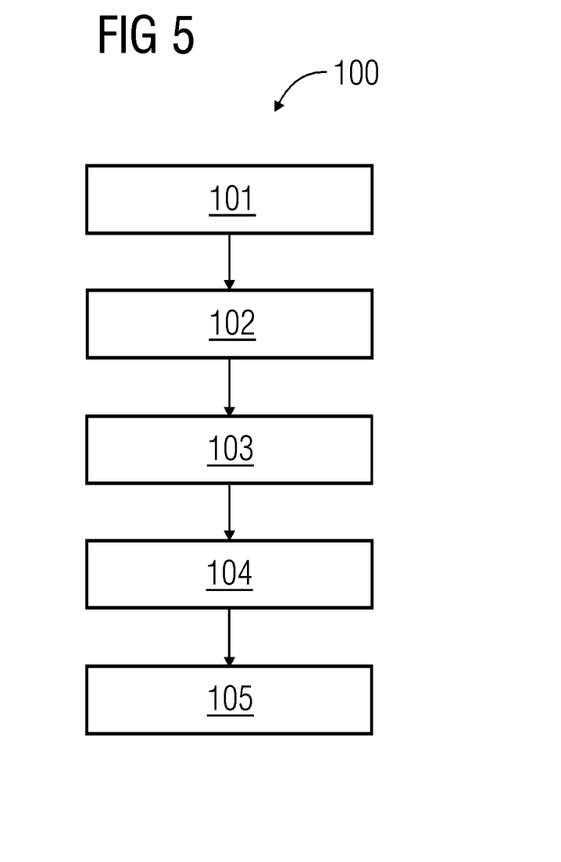
FIG. 5 schematically represents an embodiment of the present method for providing recommendation of a query processing engine from multiple query processing engines.

FIG. 5 schematically represents an embodiment of the present method 100 for providing recommendation 21 of a query processing engine 20 from multiple query processing engines 10. The method 100 for providing recommendation 21 of a query processing engine 20 from multiple query processing engines 10, the method 100 includes act 101 of receiving queries 2 having features 3 with respect to a term index ($q_t$), and corresponding service level agreement requirements 4 by a query receiving unit 5. Act 102 includes extraction of features 3 of the query 2 by a feature extractor 8 and calculating a feature weight 9 ($w_{fi}$) of each feature 3 of the query 2 in respect of the term index ($q_i$) and a query weight 11 ($W_Q$) from the feature weights 9 ($w_{fi}$) of the query 2 by the feature extractor 8. Act 103 includes checking for a similar query in a knowledge base 13 by an evaluator 12 by finding a common term vector (Cij) between the query 2 and other queries stored in the knowledge base 13 using the feature weights 9 ($w_{fi}$) and the query weight 11 ($W_Q$). Act 104 involves executing the query 2 on multiple query processing engines 10 by a scheduler 14 and collecting execution statistics 16 for each query processing engine 1 if the similar query is not found in the knowledge base 13 or fetching execution statistics 16 for each query processing engine 1 from the knowledge base 13 if the similar query is found in the knowledge base 13. Act 105 includes providing the recommendation 21 of the query processing engine 20 from multiple query processing engines 10 by the evaluator 12 based on a recommendation value 19 (RV) calculated for every query processing engine 1.

While the present technique has been described in detail with reference to certain embodiments, it may be appreciated that the present technique is not limited to those precise embodiments. Rather, in view of the present disclosure that describes exemplary modes for practicing the disclosure, many modifications and variations would present themselves, to those skilled in the art without departing from the scope and spirit of this disclosure. The scope of the disclosure is, therefore, indicated by the following claims rather than by the foregoing description. All changes, modifications, and variations coming within the meaning and range of equivalency of the claims are to be considered within their scope.

We claim:

1. A method for providing a recommendation of a query processing engine from multiple query processing engines, the method comprising:
    receiving a query having features, each feature associated with a respective term index, and corresponding service level agreement requirements by a query receiving unit;
    extracting the features of the query by a feature extractor and calculating a feature weight of each feature of the query with respect of the term index of each feature and a query weight from the feature weights of the query by the feature extractor;
    checking for a similar query in a knowledge base by an evaluator by finding a common term vector between the query and other queries stored in the knowledge base using the feature weights and the query weight;
    executing the query on multiple query processing engines by a scheduler and collecting execution statistics for each query processing engine when the similar query is not found in the knowledge base or fetching execution statistics for each query processing engine from the knowledge base when the similar query is found in the knowledge base, wherein the execution statistics comprise a query response time and a resource usage vector corresponding to each query processing engine;
    calculating a recommendation value for each query processing engine on which the query was executed and the execution statistics collected; and
    providing the recommendation of the query processing engine from multiple query processing engines by the evaluator based on the recommendation value calculated for every query processing engine.

2. The method of claim 1, further comprising:
    launching the query by the scheduler on the query processing engine recommended; and
    collecting final metrics for the evaluator to display as an output to a user.

3. The method of claim 2, wherein the final metrics comprises a report of the recommendation value calculated for each query processing engine on which the query was executed and the execution statistics for the query processing engine recommended.

4. The method of claim 3, further comprising:
    updating the knowledge base with the execution statistics, the final metrics, and the recommendation of the query processing engine.

5. The method of claim 1, wherein the receiving of the query further comprises assigning an available worker from a worker pool by a workflow manager to the query and passing the query and the corresponding service level agreement requirements by the available worker to the feature extractor.

6. The method of claim 1, wherein the recommendation value is calculated by the evaluator from a dissimilarity function derived from the query weight and a technology weight corresponding to the query processing engine, a query response time deviation factor, an unutilized resource vector, and variables dependent on the service level agreement requirements.

7. The method of claim 1, wherein the extracting of the features further comprises constructing or updating an inverted data structure maintained by the feature extractor, wherein the inverted data structure contains feature frequencies.

8. The method of claim 1, wherein the feature weight is calculated by:

$$w_{fi}(fi, Q) = 0.1 + \left\{ 0.9 * \frac{fr(fi, Q)}{\max fr(w, Q): w \in F} \right\};$$

F: Feature set $\{f_1, f_2, \ldots, f_n\}$ wherein:
    $w_{fi}(f_i, Q)$ is the feature weight of a feature $f_i$,
    fr is a feature frequency, and
    Q is the query;
and the query weight is calculated by:

$$W_Q = \Sigma_{i=1}^{n}(w_{fi} * e_i)$$

wherein:
    $W_Q$ is the query weight, and
    $e_i$ is a basis vector.

9. The method of claim 6, wherein the dissimilarity function is calculated by:

$$DSF(T) = \arccos\{(W_T * W_Q / \|W_T\| * \|W_Q\|)\};$$

wherein:
    $W_Q$ is the query weight, and
    $W_T$ is the technology weight.

10. The method of claim 6, wherein the query response time deviation factor is calculated by:

$$QRT_{deviation} = 1/n(\Sigma_{i=1}^{n}|QRT_{(Ti)} - QRT_{SLA(i)}|);$$

wherein:
    $QRT_{(Ti)}$ is a query response time for the query processing engine, and
    $QRT_{SLA(i)}$ is a query response time according to the service level agreement requirements.

11. The method of claim 6, wherein the unutilized resource vector is calculated by:

$$R_{Q\_Unused(Ti)} = R_{Available} - R_{Q\_Usage(Ti)};$$

wherein:
$R_{available}$ is an available resource metric, and
$R_{Q\_usage(Ti)}$ is a resource usage vector.

12. The method of claim 1, wherein the knowledge base stores information pertaining to at least one of feature weight, query weight, previous queries, technology weight, execution statistics, recommendation of the query processing engine, final metrics, and supporting parameters corresponding to each query processing engine.

13. The method of claim 1, wherein the knowledge base is updated by a learning process equation of posterior probability given by:

$$P(T_i=recommended|F) = P(F|T_i=recommended) * P(T_i=recommended)/P(F), \text{ and}$$

$$P(F|T_i=recommended) = \text{product of } P(f_i|T_i=recommended); \text{ where } f_i \epsilon F;$$

wherein:
P refers to the posterior probability, and
$T_i$=recommended refers to the query processing engine recommended.

14. A system for providing a recommendation of a query processing engine, the system comprising:
at least one processor configured to:
  receive a query having features and corresponding service level agreement requirements;
  assign an available worker from a worker pool for processing the query;
  store query features, execution statistics, technology weight for each query processing engine of a plurality of query processing engines, previous recommendations of the plurality of query processing engines, and final metrics, wherein the execution statistics comprise a query response time and a resource usage vector corresponding to each query processing engine;
  extract the features of the query;
  calculate a recommendation value for each query processing engine on which the query was executed and the execution statistics collected;
  evaluate the plurality of query processing engines and provide the recommendation of the query processing engine of the plurality of query processing engines based on the recommendation value calculated; and
  launch the query on the query processing engine recommended and collect execution statistics.

15. The system of claim 14, further comprising:
a display configured to display the final metrics comprising a report of the recommendation value calculated for each query processing engine of the plurality of query processing engines on which the query was executed and the execution statistics for the recommended query processing engine of the plurality of query processing engines.

16. The method of claim 2, further comprising:
updating the knowledge base with the execution statistics, the final metrics, and the recommendation of the query processing engine.

* * * * *